(12) United States Patent
Ferrao

(10) Patent No.: US 12,448,093 B2
(45) Date of Patent: Oct. 21, 2025

(54) FLOATING WIND TURBINE PLATFORM

(71) Applicant: Principle Power, Inc., Emeryville, CA (US)

(72) Inventor: Jorge Campos Antunes Ferrao, Oslo (NO)

(73) Assignee: Principle Power, Inc., Emeryville, CA (US)

( * ) Notice: Subject to any disclaimer, the term of this patent is extended or adjusted under 35 U.S.C. 154(b) by 0 days.

(21) Appl. No.: 18/681,205

(22) PCT Filed: Aug. 2, 2022

(86) PCT No.: PCT/NO2022/050188
§ 371 (c)(1),
(2) Date: Feb. 5, 2024

(87) PCT Pub. No.: WO2023/014230
PCT Pub. Date: Feb. 9, 2023

(65) Prior Publication Data
US 2024/0308631 A1    Sep. 19, 2024

(30) Foreign Application Priority Data

Aug. 3, 2021   (GB) .................................. 2111176
May 25, 2022  (KR) ......................... 10-2022-0064205
May 25, 2022  (KR) ......................... 10-2022-0064206

(51) Int. Cl.
B63B 35/44    (2006.01)
B63B 1/12     (2006.01)
(Continued)

(52) U.S. Cl.
CPC .............. *B63B 35/44* (2013.01); *B63B 1/125* (2013.01); *B63B 35/38* (2013.01);
(Continued)

(58) Field of Classification Search
CPC ...... F03D 13/25; F03D 13/256; F03D 13/126; B63B 35/38; B63B 35/44; B63B 35/4413;
(Continued)

(56) References Cited

U.S. PATENT DOCUMENTS 6,701,861 B2 * 3/2004 Key ........................ B63B 1/107
114/265
7,270,071 B1 * 9/2007 Shivers, III ......... B63B 35/4406
405/195.1
(Continued)

FOREIGN PATENT DOCUMENTS

CN    107539433 A    1/2018
CN    112009635 A    12/2020
(Continued)

OTHER PUBLICATIONS

ISR from PCT application PCT/NO2022/050188, dated Nov. 25, 2022.

*Primary Examiner* — Courtney D Heinle
*Assistant Examiner* — Behnoush Haghighian
(74) *Attorney, Agent, or Firm* — Dergosits & Noah LLP; Michael E. Dergosits

(57) ABSTRACT

The disclosure relates to a floating wind turbine platform, comprising: a substantially triangular hull configurable to support a wind turbine tower; the hull comprising a first, second and third column, the first, second and third columns being connected by a first, second and third pontoon member, as well as by a first, second and third connector.

20 Claims, 7 Drawing Sheets

(51) Int. Cl.
  *B63B 35/38* (2006.01)
  *F03D 1/00* (2006.01)
  *F03D 9/30* (2016.01)
  *F03D 13/10* (2016.01)
  *F03D 13/25* (2016.01)

(52) U.S. Cl.
  CPC ............ *B63B 35/4413* (2013.01); *F03D 1/00* (2013.01); *F03D 9/30* (2016.05); *F03D 13/126* (2023.08); *F03D 13/256* (2023.08); *B63B 2035/446* (2013.01); *F05B 2220/30* (2013.01); *F05B 2240/93* (2013.01)

(58) Field of Classification Search
  CPC .......... F05B 2230/6102; F05B 2240/93; F05B 2240/95; F05B 2240/97; F05B 2240/98
  USPC .......................................... 114/264, 266, 267
  See application file for complete search history.

(56) References Cited

U.S. PATENT DOCUMENTS

| | | | |
|---|---|---|---|
| 9,533,738 B2* | 1/2017 | Tominaga | B63B 1/12 |
| 11,142,291 B2* | 10/2021 | Yang | B63B 1/125 |
| 2002/0090270 A1* | 7/2002 | Malcolm | B63B 35/4413 |
| | | | 405/195.1 |
| 2020/0022341 A1* | 1/2020 | Li | A01K 61/65 |
| 2020/0216148 A1 | 7/2020 | Li et al. | |
| 2023/0331358 A1* | 10/2023 | Caruso | B63B 5/16 |

FOREIGN PATENT DOCUMENTS

| | | |
|---|---|---|
| EP | 3674198 A1 | 7/2020 |
| WO | 2020/167137 A1 | 8/2020 |

\* cited by examiner

FLOATING WIND TURBINE PLATFORM

CROSS-REFERENCE TO RELATED APPLICATIONS

The present application claims the benefit of PCT App. No. PCT/NO2022/050188, entitled "A Floating Wind Turbine Platform," filed Aug. 2, 2022, which claims priority to each of the following: Great Britain Patent Application No. 2111176.0, entitled "A Floating Wind Turbine Platform," filed Aug. 3, 2021; Korean Patent Application No. 10-2022-0064205, entitled "Floating Wind Turbine Platform," filed May 25, 2022; and Korean Patent Application No. 10-2022-0064206, entitled "Floating Wind Turbine Platform," filed May 25, 2022, each of which are hereby incorporated by reference.

TECHNICAL FIELD

The present disclosure relates to a floating wind turbine platform. More specifically, the disclosure relates to a floating wind turbine platform.

BACKGROUND ART

Floating, offshore wind energy converters are being studied and developed by various research and development (R&D) groups, both within academia and industry. While not yet in widespread commercial use, it is expected that further development of floating offshore wind technology will make such plants more competitive and a viable alternative for many locations in the near future.

A challenge associated with floating offshore wind energy converters is their construction and installation in an offshore location. While onshore construction may be more easily achieved, this may cause problems later, as a large structure may then require to be moved to an offshore location. Alternatively, transporting parts of a floating offshore wind energy converter to an offshore location may be relatively simple, but subsequent construction in an offshore location may be problematic.

Due to the large forces that are experienced by floating offshore wind energy converters, both due to wave and tidal forces, and wind forces, it is important that floating offshore wind energy converters be designed and constructed to a high quality. In particular, a platform of a floating wind energy converted must be constructed to be able to provide buoyancy, as well as support a wind turbine tower and withstand direct wave and tidal forces. Therefore, there is a need for a platform for a floating wind turbine that has both structurally sound and easy to construct.

SUMMARY

It is an object of the present disclosure to mitigate, alleviate or eliminate one or more of the above-identified deficiencies and disadvantages in the prior art. According to a first aspect there is provided a floating wind turbine platform comprising a substantially triangular hull configurable to support a wind turbine tower. The hull comprises a first, second and third column, the first, second and third columns being connected by a first, second and third pontoon member, as well as by a first, second and third connector.

Further aspects and embodiments according to the present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIGS. 1a-b shows an example of a known wind turbine and floating platform.

FIGS. 5a-c and 6a-c schematically illustrate various ballast arrangements in a floating platform.

Figure 7:
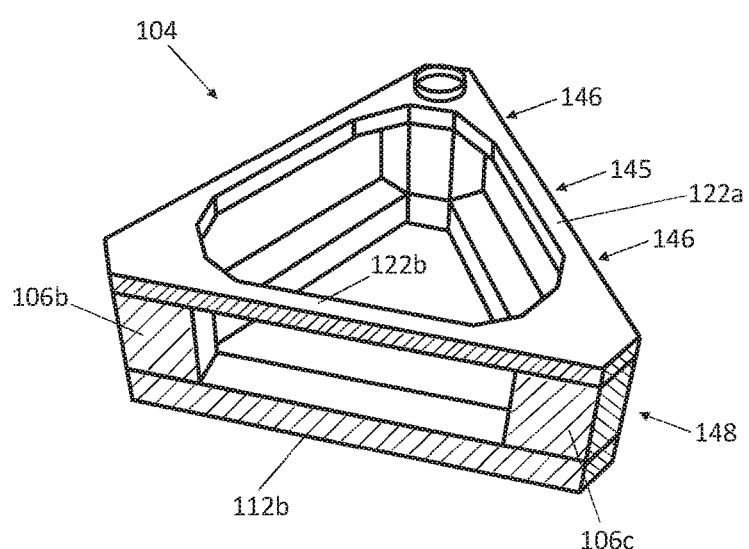
Figure 8:
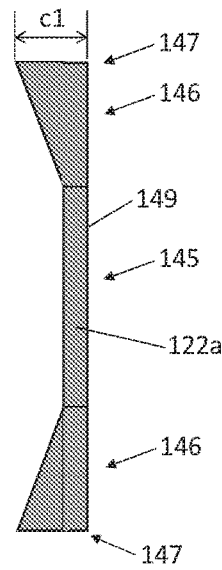

FIGS. 7 and 8 illustrate aspects of a platform in an embodiment.

Figure 9:
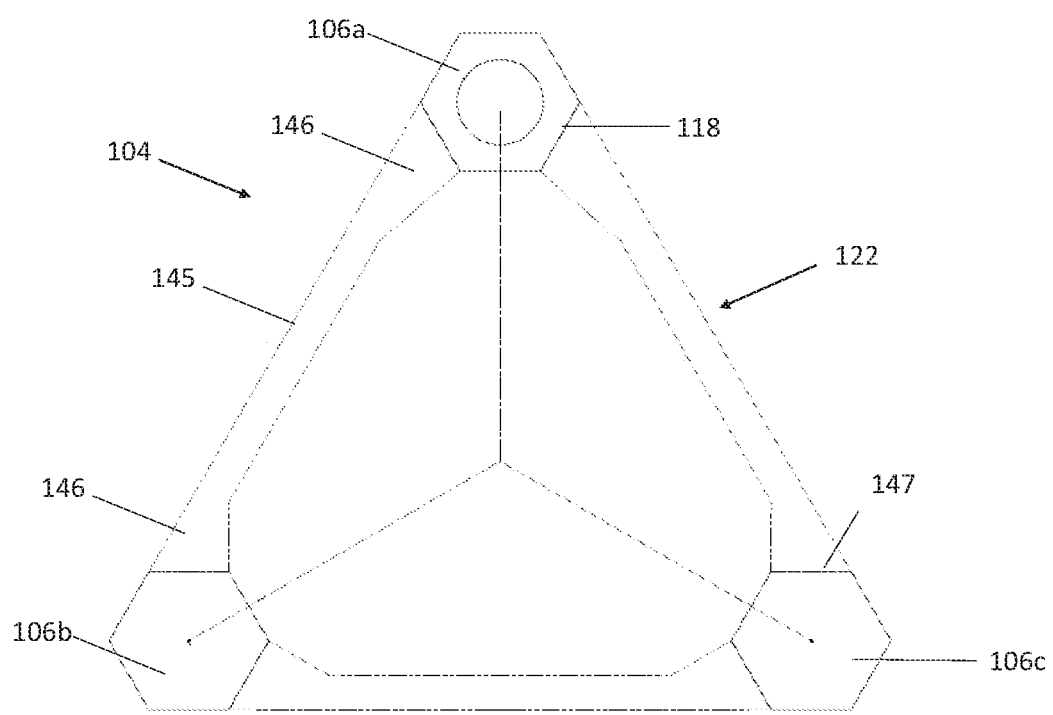

FIG. 9 illustrates a further example of a floating platform.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

In this disclosure, the terms 'side' and 'surface' are used interchangeably and indicate a side or a surface of a hull for example defined by a steel plate. While terms such as 'inner', 'outer', 'external' and 'internal' are used in the description, it should be understood that these may be used to indicate relative positions or orientations relative to e.g. the triangle centre/centroid or other components. Unless otherwise indicated, sides and surfaces discussed in this disclosure refer to outside faces of the hull, i.e. not sides or surfaces located inside the hull. (As will be clear, the hull may have a number of other structural elements on its inside, such as strengthening plates etc., which are not described here.)

Figure 1A:
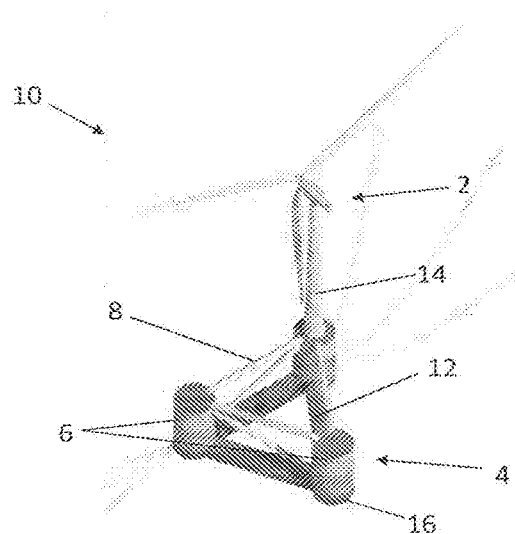
Figure 1B:
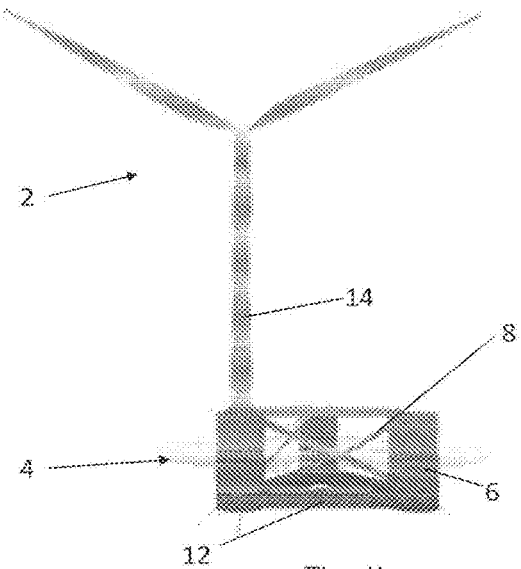

FIGS. 1a-b show an example of a known offshore wind energy converter 10 comprising a floating wind turbine 2 and floating platform 4. Here, the floating platform 4 comprises three cylindrical columns 6, which are connected together by a number of upper supports 8 and lower supports 12 in a triangular formation. Mounted to the floating platform 4 via one of the cylindrical columns 6 is a wind turbine tower 14. The floating platform 4 may be positioned in an offshore location and may provide support and buoyancy for the wind turbine tower 14. As illustrated, the floating platform 4 comprises a plurality of anchor points 16, which serve the purpose of anchoring the wind energy converted 10 in a desired position in an offshore location. In particular, an anchor point 16 is located on each of the columns 6.

Figure 2:
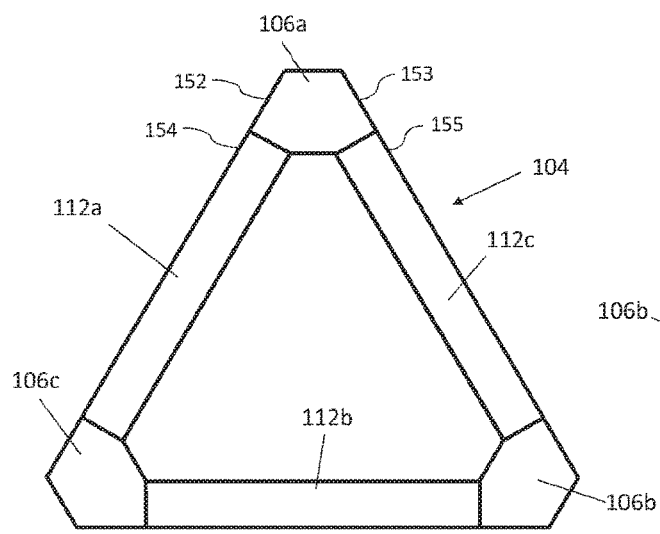
FIG. 2 is an exemplary plan view of a floating platform according to the present disclosure.
Figure 3:
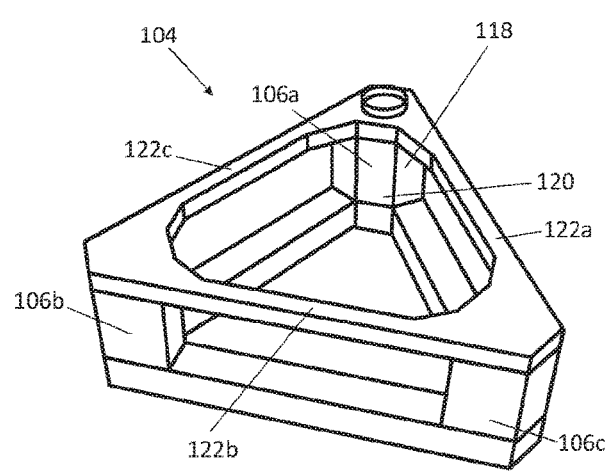
FIG. 3 is a perspective view of a floating platform according to the present disclosure.

FIG. 2 illustrates a view of the underside of a floating platform 104 according to an aspect of the present disclosure, while FIG. 3 illustrates a perspective view of a floating platform 104. In FIG. 2, the floating platform 104 comprises a hull that is comprised of a first, second and third column 106a-c, which are connected together by a first, second and third pontoon member 112a-c. In this example, the pontoon members 112a-c are connected in the form of a triangle, although the skilled reader will understand that other connection configurations may be possible that result in alternative shapes of the floating platform 104.

While in the example of FIGS. 1a-b the columns 6 have a cylindrical shape, in the example of FIG. 2, it can be seen that the columns have a lateral cross-section that is in the shape of an irregular polygon. As such, the columns in the example of FIG. 2 (and as can also be seen in FIG. 3) are in the shape of an irregular polygonal prism. In particular, the columns have a lateral cross-section in the shape of an irregular hexagon, although it should be appreciated that other shapes of lateral cross-section may be possible (e.g. an irregular pentagon shape). Having the columns 106 in the shape of an irregular polygon may assist in the construction of the floating platform 104, as it may permit the columns to be more simply constructed, for example out of flat panels which may be relatively simply connected together (e.g. by welding, bolting etc.). As will be further described, the shape of the columns may additionally permit a simpler and more structurally sound connection with a corresponding pontoon member 112a-c.

Here, the columns 106a-c have a lateral cross-section shaped so as to enable the connection of a pontoon member 112a-c relative to an intersecting surface 118 such that the intersecting surface extends (e.g. longitudinally extends) perpendicular to the longitudinal axis of the pontoon member 112a-c connecting to the column 106a-c. The intersecting surface 118 corresponds to an external surface of each of the columns 106a-c that, as will be described later, may correspond to a flat panel used to construct the column 106a-c. The pontoon member 112a-c may be connected directly to the intersecting surface 118, or may be connected adjacent the intersecting surface.

As illustrated in both FIGS. 2 and 3, columns 106a-c are located at each apex of the triangular shaped floating platform 104. The columns 106a-c of this example have a lateral cross-section of an irregular hexagon, three sides of which define the shape of each apex of the floating platform 104 (in the form of a truncated apex). The three sides defining the apex of the floating platform 104 may be considered to be the externally facing sides of the column 106a-c, while the remaining three sides may be considered to be internally facing sides. Two of the remaining three sides (e.g. two of the internally facing sides) define intersecting surfaces 118, which are angled so as to enable connection of a pontoon member relative to a column such that the longitudinal axis of the pontoon member 112a-c is perpendicular, or substantially perpendicular, to the intersecting surface 118. Finally, each of the columns 106a-c defines an intermediate plate 120 positioned between the point of intersection (e.g. connection) between the pontoon members 112a-c. In some examples, the intermediate plate 120 may be absent, in which case each of the intersecting surfaces may be directly adjacent. The column in such a case may have a lateral cross-section in the shape of a pentagon.

Having a pontoon member 112a-c that intersects a column 106a-c such that the longitudinal axis of the pontoon member 112a-c is perpendicular to the intersecting surface of the column 106a-c may provide a platform that is more structurally sound and easier to construct than what is known. For example, the area of intersection between the pontoon member 112a-c and the column 106a-c is reduced compared to the pontoon members 112a-c intersecting the columns 106a-c at an oblique angle.

The columns 106a-c may be constructed from a plurality of flat panels. The flat panels may be connected together by welding, bolting, or the like. In order to construct columns 106a-c having a lateral cross-section of an irregular polygon, several flat panels having differing widths may be connected together along a longitudinal edge to form the columns. Although each of the flat panels may have differing widths, the flat panels may have identical lengths. By forming the columns 106a-c with a plurality of flat panels, it may be possible to achieve the lateral cross-section as illustrated in FIGS. 2 and 3, having an intersecting surface 118 for connection of each pontoon member 112a-c thereto. By varying the width of one, some or all of the flat panels, the designer may be able to vary the lateral cross-sectional shape of the columns 106a-c, depending on their specific needs.

Each pontoon member 112a-c may connect to a column 106a-c in any appropriate way. For example, the pontoon member may connect directly to an intersecting surface 118, for example by bolting, welding, or the like, and such one end of the pontoon member (e.g. the entire lateral area of the end of the pontoon member) abuts against the intersecting surface 118 of the column 106a-c. Alternatively, a or each pontoon member 112a-c may connect adjacent (e.g. directly adjacent) an intersecting surface. In the normal orientation of the floating platform 104, the pontoon member 112a-c may connect directly below intersecting surface 118. In such cases, the pontoon member 112a-c may connect to a column 106a-c around its periphery, or may connect to the base of the column 106a-c.

In FIG. 3, an example is shown whereby the pontoon members connect to the base of the columns 106a-c. In this example, the pontoon members may be in the form of a triangular collar, the corners of which may connect to the base of the columns 106a-c. In this example, each of the pontoon members 106a-c may be connected together at the ends thereof. The corners of the triangular collar may be shaped so as to be flush with the sides of the externally facing sides of the columns 106a-c.

As will be described in further detail in the following paragraphs, the pontoon members may be hollow, and/or may comprise equipment therein. Is some examples the pontoon members may comprise a ballast arrangement therein which may be operable by a user to vary the buoyancy of the floating platform 104.

Although not illustrated in FIG. 2, the columns 106a-c may also be connected together via a plurality of connectors 122a-c. The plurality of connectors 122a-c may connect to the columns above the point of connection with the pontoon members 112a-c and may function to provide structural support. The connectors 122a-c may extend parallel to the pontoon members 112a-c, or may extend at an angle thereto.

One single connector 122*a-c* may extend between each column 106*a-c*, or a plurality of connectors 122*a-c* may extend between the columns 106*a-c*. The connectors 122*a-c* may have a smaller cross-sectional area than the pontoon members 112*a-c*. One example of connectors 122*a-c* is illustrated in FIG. 3. In this example, the connectors 122*a-c* are in the form of a triangular collar that is connected to the top of the columns 106*a-c*. As such, in this example, the connectors 122*a-c* are connected to each adjacent connector 122*a-c* at one end thereof, similar to the configuration of the pontoon members 112*a-c*. Also similar to the configuration with the pontoon members 112*a-c*. The connectors 122*a-c* are connected to the columns such that the part of each connector 122*a-c* that is connected to the top of each column 106*a-c* is flush relative the externally facing sides of each column 106*a-c*. Such a configuration may improve the structural design of the floating platform 104 by removing any ledges or angles which may form stress concentration points on the floating platform in use 104.

In other examples, the connectors may take an alternative form. For example the connectors may be in the form of cylindrical beams that connect to the side of each of the columns 106*a-c*. Similar to the pontoon members, one end of each of the connectors 122*a-c* may abut a surface of the columns 106*a-c*. Alternatively, each of the connectors 122*a-c* may connect to a column 106*a-c* via a connection interface, such as via a pin connector or threaded connector.

Figure 4:
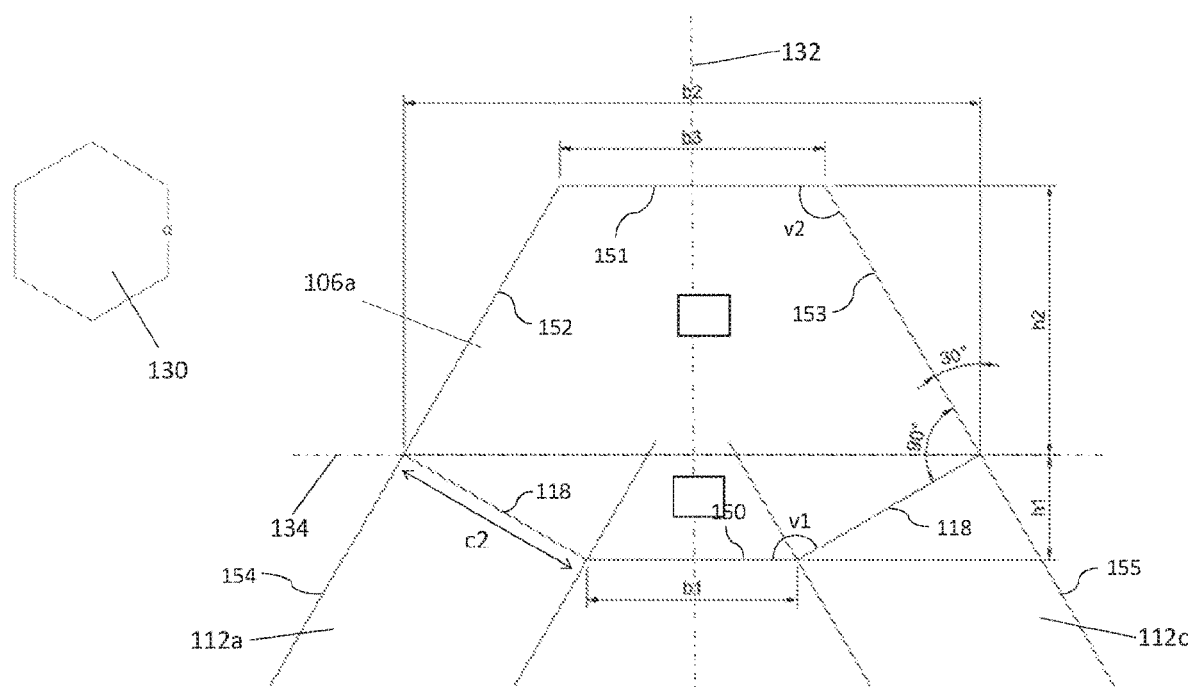
FIG. 4 is a schematic top view of parts of a platform.

A cross-sectional shape of the columns 106*a-c* according to one example is shown in greater detail in FIG. 4. Here, the first column is illustrated relative to a regular hexagon 130 having side length a. As illustrated, the cross-section of the column 106*a* is symmetrical about a central axis 132 extending between the centre of the cross-section and the centre of the floating platform 104, e.g. when viewed from above. However, about a lateral axis 134 rotated 90 degrees the cross-section is asymmetrical. The lateral axis 134 divides the cross-section in two, such that three internal sides of the hexagon lie on one side of the lateral axis 134 proximal the adjacent pontoon members 112*a*, 112*c*, while the remaining three external sides of the hexagon lie on the other side of the lateral axis 134. The three internal sides comprise one intermediate side and two adjoining sides to the external sides, and the three external sides comprise one intermediate side and two adjoining sides to the internal sides. Each of the intermediate sides is parallel to the lateral axis 134, while each of the adjoining sides extends obliquely relative to the lateral axis 134.

As illustrated in FIG. 4, two variables of the shape of the cross-section are h1 and h2. h1 corresponds to the distance of the internal intermediate side from the lateral axis 134, while h2 corresponds to the distance of the external intermediate side from the lateral axis 134. In this example the distance h2 is greater than h1.

Three further illustrated variables are b1, b2 and b3. b1 and b3 correspond to the length of the internal and external intermediate sides, respectively, while b2 corresponds to the overall length of the cross-section in a direction along the lateral axis 134.

By varying h1, h2, b1, b2 and b3 various forms of irregular hexagon are possible. In the illustrated example, the variables have been chosen such that the angle between the corresponding internal and external adjoining sides is 90 degrees. Equally, the variables have been chosen such that there is an angle of 30 degrees between the external adjoining sides and the central axis 132. This particular configuration permits the external adjoining sides to extend parallel to the length of the adjacent pontoon members, while the internal adjoining sides extend perpendicular to the length of the adjacent pontoon members. As such, the external adjoining sides are able to be located flush with an external surface of the adjacent pontoon members 112*a,c*, while the internal adjoining sides (which also are part of the intersecting surface) are able to join to the adjacent pontoon members 112*a*, 112*c* at a right angle.

As can also be seen, the angle between the internal adjoining sides and the internal intermediate side is greater than the angle between the external adjoining sides and external intermediate side. This, and the other variables have the effect of a greater area being encapsulated between the lateral axis 134 and the external sides compared to the area encapsulated between the lateral axis 134 and the internal sides. More specifically, given that the angles between the sides of a regular hexagon are 120 degrees, the angle between the internal adjoining sides and the internal intermediate side may be greater than 120 degrees, while the angle between the external adjoining sides and the external intermediate side may be less than 120 degrees. The variables may be chosen such that the total area of the cross-section is the same as would be the case if it were a regular hexagon.

In some examples, the length b1 may be reduced or extended, depending on the width of the pontoon members, for example. Here, the internal intermediate side is shorter than the external intermediate side, although it should be appreciated that in some examples, both intermediate side may be the same length, or the external intermediate side may be the shorter side.

FIGS. 5*a-c* and 6*a-c* illustrate two examples of a floating platform 104 comprising a ballast arrangement 124 therein. The ballast arrangement 124 may be in the form of a ballast compartment or a number of ballast compartments contained within the floating platform 104 (e.g. within a hollow section of the floating platform 104). Each ballast compartment may be in the form of a void within the floating platform 104. The ballast compartments may comprise a ballast tank configured to hold a liquid such as freshwater or seawater, or may be configured to hold a solid ballast material which may be removed and inserted as necessary. In some examples, a ballast compartment, or the ballast compartments, may comprise a plurality of ballast tanks therein.

Figure 5A:
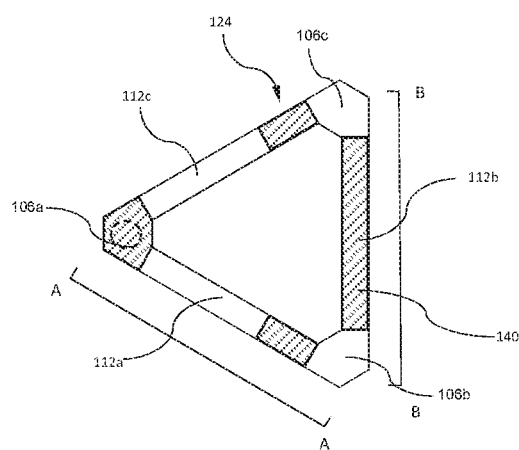
Figure 5B:
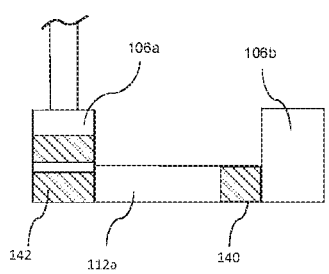
Figure 5C:
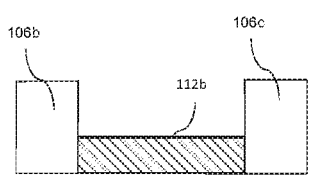

FIG. 5*a* illustrates a plan view of a floating platform 104, illustrating a triangular-shaped pontoon base and a first, second and third column 106*a-c* located at each corner thereof. FIG. 5*b* illustrates an elevation view of the floating platform 104 from the viewpoint A-A, while FIG. 5*c* is an elevation view of the floating platform 104 from the viewpoint B-B.

In this example, a first ballast compartment 140 is located along the entire length of the pontoon member 112*b*, located between the second and third columns 106*b*, 106*c*, while part of pontoon members 106*a*, 106*c* also comprise the first ballast compartment 140. As the pontoon base is in the form of a triangle, the first ballast compartment 140 may be considered to be located along the entire length of the pontoon member 112*b* oppositely disposed from the first column 106*a*. In this example, the section of the first and third pontoon members 112*a*, 112*c* that may be considered to be adjacently disposed to the second pontoon member 112*b* (and to the first column 106*a*) comprise part of the ballast compartment 140. The ballast compartment 140 may extend part way along the first and third pontoon members 112*a*, 112*c*, for example half way along, two-thirds of the way along, one-third of the way along, one-quarter of the way along, or the like. The ballast compartment 140 may be one single compartment (e.g. containing one continuous void for placement of a ballast material or liquid), or may comprise multiple compartments and/or voids, for example one compartment/void in the second pontoon member 112b, and one compartment in each of the first and the third pontoon members 112a, 112c.

The first ballast compartment 140 may be a void in one or more pontoon members 112a-c, and then a ballast tank may be set into the pontoon members 112a-c. Alternatively the ballast tank may be formed by the material of the pontoon members 112a-c themselves (e.g. a sealed void within the pontoon members), meaning that no separate ballast tank is required to be formed into the pontoon members 112a-c. In some examples, the pontoon members 112a-c may comprise a bulkhead or multiple bulkheads. The or each bulkhead may define a boundary of a corresponding ballast compartment or tank. A bulkhead may be located, for example, at the centre of the opposite pontoon member 112b, and may be longitudinally moveable therealong to vary the volume of the first ballast compartment 140 on either side of the bulkhead. In the case where the first ballast compartment 140 is configurable to contain a liquid such as water, the bulkhead may be able to be pressed into the liquid volume in the ballast compartment, so as to remove any residual gas therein, thereby removing any liquid/gas boundary and ridding the ballast compartment of unwanted surface effects due to motion of the floating platform 104.

In addition, here the bottom of the first column 106a comprises a second ballast compartment 142. The second ballast compartment 142 may be in the form of a base unit 142, which may be incorporated into the first column 106a, or connectable thereto. In some examples, the bottom of the first column 106a (as illustrated in FIGS. 5a to c) including the second ballast compartment 142 may be considered to form part of the pontoon base 120. The second ballast compartment 142 may be formed in the base of the first column 101, and may not extend higher than the uppermost surface of pontoon base. The intersection between the pontoon member 120d-f and the column 110 may conveniently form, or assist to form, a compartment at the base of the column 110 in which the ballast compartment 142 may be located.

As with the ballast compartment 140, the second ballast compartment 142 may comprise a ballast tank, or the material of the column 106a may define the ballast compartment. Where the second ballast compartment is a base unit 142, the base unit may be or define a ballast tank, connectable to the first column 106a. In some example, the column 106a, the second ballast compartment 142 may comprise a bulkhead therein, which also may be used to remove or reduce surface effects.

Illustrated in FIG. 5b, the second ballast compartment 142 may comprise an upper and a lower portion. The upper portion may be located above the height of the uppermost surface of the pontoon member 112a-c, whereas the lower portion may be located below the height of the uppermost surface of the pontoon member 112a-c, as is illustrated. The upper and lower portions may be connected and/or in fluid communication, or may be separate from one another. The upper portion may comprise an upper ballast tank, whereas the lower portion may comprise a lower ballast tank. In some examples, the upper and lower portions may comprise a single ballast tank spanning both portions.

The second ballast compartment 142 may be in fluid communication with the first ballast compartment 140, for example via a ballast liquid transfer arrangement. For example, tubing or piping may extend in the floating platform 104 between the first and second ballast compartments 140, 142, which may enable a user to transfer ballast liquid between the first and second ballast compartments 140, 142, thereby enabling simple and quick redistribution of weight of the floating platform 104.

This ballast arrangement 124 may provide for stability during operation, as it may enable the floating platform 104 to be weighted so as to offset the weight of the wind turbine tower 102 by optionally providing a counterweight at the opposite end of the floating platform 104.

The example of 6a-c provides a different configuration of a ballast arrangement 124. As in the previous example the first column 106a comprises a second ballast compartment 142, which will not be described further.

In this example, the first ballast compartment 140 is located along the entire length of the pontoon member 112b (as in previous examples), located between the second and third columns 111, 112. In contrast to the previous example, the first ballast compartment 140 is contained within the pontoon member 112b and does not extend into adjacent pontoon members 112a, 112c. However, in this example, the second and third columns 106b, 106c also contain ballast compartments, which may be in the form of base units as previously described. The ballast compartment of the second and third columns 106b, 106c may form part of the first ballast compartment 140, or they may be separate ballast compartments (e.g. in the form of base units), self-contained within each column 106b, 106c.

Figure 6A:
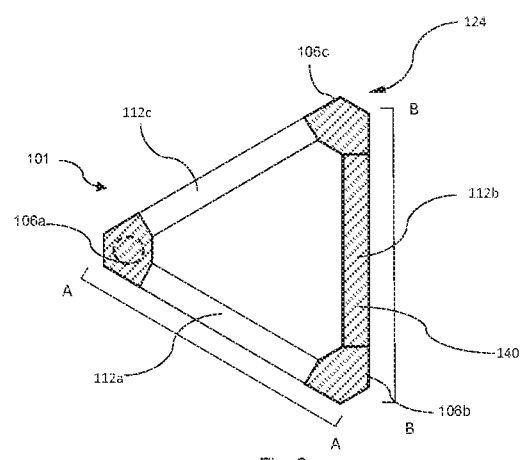
Figure 6B:
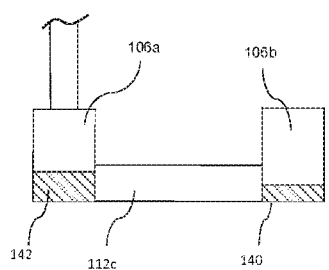
Figure 6C:
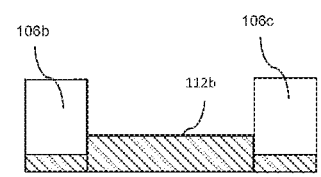

As is best illustrated in FIGS. 6b and 6c, the ballast compartment of the second and third columns 106b, 106c may be shallower than that in the pontoon member 112b, and even than that of the first column 106a. In some examples, the ballast compartment of the second and third columns 106b, 160c may hold a solid ballast material, while the pontoon member 112b may hold a liquid ballast material (or vice versa). Although illustrated as being shallower than the ballast compartments of both the pontoon member 112b and the first column 106a, in some examples it may be possible that the ballast compartment is deeper than one or both of the aforementioned.

The configuration of ballast arrangement 124 of FIGS. 6a-c may provide an alternative weight distribution to that previously described in FIGS. 5a-c.

In any of the embodiments claimed or described herein, the pontoon member 112b which is located opposite the tower may be configured to hold more liquid ballast than the column 106a or the corner part associated with the tower column. Advantageously, the pontoon member 112b may be configured to hold more liquid ballast than the tower column or corner part by a factor of two, three or four (i.e., more than double, more than three times or more than four times the liquid ballast capacity of the tower column or corner part).

In any of the embodiments claimed or described herein, each of the two pontoon members 112a,c extending from the tower column or corner part associated with the tower column may be configured to hold more liquid ballast in a distal half of the respective pontoon member than in the half of the pontoon member which is proximal to and connects to the tower column or corner part. (See, for example, FIG. 5A.) This can, for example, be realised by arranging liquid ballast tanks in a part of the pontoon member 112a,c which is closer to a distal column 106b,c than to the tower column 106a.

In both the ballast arrangements 124 of FIGS. 5a-c and 6a-c, it may be possible to vary the ballast weight provided by each ballast compartment, thereby enabling a substantial degree of control over the weight distribution, centre of gravity and overall weight of the wind turbine platform 100. For example, a lighter platform may be useful during installation and maintenance. Depending on the stage of installation (e.g. whether only the turbine tower is mounted on the floating platform 104, or both the tower and the nacelle with blades), variation of the centre of gravity of the floating platform 104 may be a desirable feature. Variation of the weight and/or the centre of gravity of the floating platform 104 may provide easier access and/or improved stability of the floating platform 104 and the wind turbine platform 100 overall.

Referring now to again to FIG. 4, in some embodiments each of the first, second and third columns 106a-c may comprise an inner intermediate side 150 and an outer intermediate side 151, where the inner and outer intermediate sides 150,151 are arranged parallel to each other and perpendicular to an axis 132 extending between the centre of the lateral cross-section (i.e. a centre point laying on the axis 132) and the centre of the floating platform 104, i.e. the triangle centre/centroid. The terms 'outer' and 'inner' refer to the position relative to the triangle centre/centroid, i.e. such that the outer intermediate side 151 is farther away from the centroid than the inner intermediate side 150.

Advantageously, a horizontal length b1 of the inner intermediate side 150 can be equal to or smaller than the horizontal length b2 of the outer intermediate side 151.

Each of the first, second and third columns 106a-c may further comprise a first external side 152 adjoining a first intersecting surface 118 and a second external side 153 adjoining a second intersecting surface 118. Advantageously, the first and second external sides 152,153 can each be arranged flush with an outer side 154,155 of a respective pontoon members 112a-c. (See also FIG. 2.)

Alternatively, or additionally, the first and second external sides 152,153 can each be arranged flush with an outer side 149 (see FIG. 8) of a respective connector 122a-c.

Illustrated in FIG. 7, optionally on each of the three sides of the substantially triangular hull, the respective external side 152,153 of the column 106a-c, the outer side 154,155 of the pontoon member 112a-c and the outer side 149 of the connector 122a-c can be arranged to be coplanar. (As indicated by the hatched area in FIG. 7.)

The above options can, for example, be obtained by constructing the hull from flat plates, such as steel plates. Having such flush and/or coplanar surfaces can provide manufacturing advantages and benefits in relation to the hull's structural strength, for example that internal reinforcement members can be easier employed during manufacturing onto or between separate construction plates arranged with zero or ninety degree angles between them.

Referring now to FIG. 8 (and also visible in FIGS. 3 and 7), the connectors 122a-c may advantageously comprise a narrowed, central portion 145 and widened, end portions 146, wherein at outer ends 147 of the connector 122a-c the widened end portion 146 has a horizontal length c1 which is equal to the horizontal length c2 (see FIG. 4) of the adjacent intersecting surface 118. In this manner, the connectors 122a-c can be structurally connected to the columns 106a-c similarly as the pontoon members 112a-c are, i.e. across the full length of the intersecting surface 118, while having a reduced cross-section in the central portion 145. This can provide beneficial load transfer between the ends 147 and the columns 106a-c while reducing weight and material use if the load capacity requirements of the connectors 122a-c can be satisfied with a reduced cross-section in the central portion 145.

Advantageously, the connectors 122a-c are arranged with a planar outward-facing vertical side 149 (see FIG. 8) between the ends 147, and wherein the reduction in the cross-section in the narrowed, central portion 145 is obtained by indentation at an inward-facing side of the connectors 122a-c, as also illustrated in FIG. 7. Particularly, the entire outward-facing vertical side 149 can be a single, straight planar surface.

Referring now to FIG. 4 again, in each of the columns 106a-c the inner intermediate side 150 can be connected to two adjoining intersecting surfaces 118, the outer intermediate side 151 can be connected to two adjoining external sides 152,153, and each intersecting surface 118 can be connected to a respective external side 152,153 to form a hexagonal lateral cross-section of the column.

Advantageously, an angle v1 between the inner intermediate side 150 and the intersecting surfaces 118 can be made greater than an angle v2 between the outer intermediate side 151 and the external sides 152,153 so as to produce an irregular hexagon.

Each intersecting surface 118 can be connected to a respective external side 152,153 at an angle of 90 degrees.

Advantageously, the sum of the horizontal length of the inner intermediate side 150 and the intersecting surfaces 118 can be made less than the sum of the horizontal length of the outer intermediate side 151 and the external sides 152,153. Additionally or alternatively, the individual horizontal lengths of the inner intermediate side 150 and the intersecting surfaces 118 are less than the individual horizontal length of any of the outer intermediate side 151 and the external sides 152,153. (I.e. sides 151, 152 and 153 are all longer than sides 118 and 150.)

Illustrated in FIG. 7, the outer intermediate side 151 may also form (or form part of) a planar edge surface 148 of the hull. By 'edge surface' here is meant a vertical surface arranged at the edge portions of the substantially triangular hull. While the hull may have such surfaces and therefore not form a perfect triangle, it is nevertheless substantially triangular in that the edge surfaces 148 are considerably shorter than the sides, for example less than one-fifth or less than one-tenth of the sides.

Advantageously, the planar edge surface 148 is a single planar surface extending across the full height of the hull. The planar edge surface 148 can be made up entirely of the outer intermediate side 151, if the columns 106a-c extend across the full height of the hull, or it can be made up partly of the pontoon members 112a-c and/or the connectors 122a-c if these components extend towards the edges and is fixed to the columns 106a-c above and/or below the columns 106a-c.

The hull may, about its horizontal periphery, comprise six, preferably exactly six, planar, vertical surfaces making up the outermost bounds of the hull in the horizontal plane. The six or exactly six surfaces can be defined by three planar side surfaces 149,152,153,154,155 and three planar edge surfaces 148.

FIG. 9 illustrates an example of a floating wind turbine platform 104 comprising connectors 122 comprising a narrowed central portion 145, widened end portions 146 and ends 147.

As previously described, the connectors 122 widen from the narrowed central portion 145 towards the ends 147. The narrowed central portion 145 may widen linearly from the central portion 145 towards the end 147. As in this example the horizontal or lateral cross-section of the widened end portions 146 has the shape of a triangle, or a truncated triangle and/or a trapezoid. The widened end portions 145 widen from the width of the narrowed central portion 145 to a horizontal length c2 (see FIG. 4, for example) which may be equal to that of an adjacent intersecting surface 118. In this and previous examples, the connectors may connect along the entire width of the adjacent intersecting surface 118.

Here, a first column 106*a* is configurable to mount a structure, such as a wind turbine thereon. Here, each column 106 is connected to two adjacent connectors at an end thereof 147, and therefore is also connected to two adjacent widened end portions 146. As illustrated, the widened end portions 146 that are adjacent to the first column 106*a* are longer in the axial direction of the respective adjacent connector 122 (e.g. have a greater axial length than) as compared to the widened end portions 146 that are adjacent the second and third columns 106*b,c*, that may not be configured for a structure to be mounted thereon (e.g. the top surface thereof may be flat, and without a base structure to which a wind turbine may be mounted). Additionally, the connectors 122 that connect to the first column 106*a* have shorter narrowed central portions 145 as compared to the connector 122 that is not connected to the first column 106*a*.

Having longer end portions 146 adjacent the first column 106*a* and shorter narrowed central portions 145 may permit a smoother load distribution through the connectors 122 in the vicinity of the first column 106, which may require to bear higher loads as a result of having a structure mounted thereon.

Additionally illustrated in this example, the columns 106 each have an identical lateral cross-sectional shape, as illustrated in previous examples, and have a lateral cross-section in the shape of a regular hexagon, although it should be noted that other lateral cross-sections may be possible, for example those as previously described. As the lateral cross-sections are regular hexagons, the intersecting surfaces 118 connecting each end of a connector 122 are not parallel, and as such the ends 147 of the connectors 122 extend at an oblique angle relative to the longitudinal axis of the connectors 122. It should be noted that in some examples, columns 106 having an irregular polygonal lateral-cross sections (as described in relation to the previous Figures) may also be used in this example, such that the intersecting surfaces 118 connecting each end of a connector 122 may be parallel, in which case the ends 147 of the connectors may extend perpendicular to the longitudinal axis of the connectors 122. In cases where the intersecting surfaces 118 connecting each end of a connector 122 are parallel, the widened end portion 146 may have parallel ends, and therefore may be considered to have a trapezoidal shape.

As illustrated, the connectors 122 connect to the intersecting surfaces at an interface forming an interface area between the connectors 122 and the intersecting surfaces 118. Each connector 122 forms two interfaces on intersecting surfaces 118 of the columns 106. Each interface may comprise a centroid, with an interface axis extending between the interfaces formed by each connector. In this example the interface axis is misaligned, although parallel to, the longitudinal axis of the respective connector 122. The connector longitudinal axis is offset in a direction away from the centre of the floater 104, towards the exterior of the floater 104.

The features according to FIGS. 4, 7, 8 and 9 and the associated description provide, individually or collectively, advantages of enhanced structural strength and reliability combined with good manufacturability, in that, for example, internal strengthening of the hull is simplified and/or that the design is better suited to handle load hotspots such as the loads acting in the interfaces on the inner side of lateral axis 134. For example, providing an irregular polygon/hexagon which is skewed in relation to the lateral axis 134 (see FIG. 4) in a beneficial manner, can improve load handling capability of the floater.

The person skilled in the art realises that the present disclosure is not limited to the preferred embodiments described above. The person skilled in the art further realises that modifications and variations are possible within the scope of the appended claims. Additionally, variations to the disclosed embodiments can be understood and effected by the skilled person in practicing the claimed disclosure, from a study of the drawings, the disclosure, and the appended claims.

Further examples and embodiments are outlined in the following sets of clauses:

A-Clauses

CLAUSE A1. A floating wind turbine platform (104), comprising:
a substantially triangular hull configurable to support a wind turbine tower;
the hull comprising a first, second and third column (106*a-c*), the first, second and third columns (106*a-c*) being connected by a first, second and third pontoon member (112*a-c*), as well as by a first, second and third connector (122*a-c*);
wherein the lateral cross-section of each of the first, second and third columns (106*a-c*) has the shape of an irregular polygon.

CLAUSE A2. The floating wind turbine platform (104) according to clause A1, wherein each of the first, second and third columns (106*a-c*) comprises two axially extending intersecting surfaces (118), each intersecting surface (118) being oriented perpendicular to the longitudinal axis of a pontoon member (112*a-c*).

CLAUSE A3. The floating wind turbine platform (104) according to any preceding clause, wherein the lateral cross-section of each of the first, second and third columns (106*a-c*) has the shape of an irregular hexagon.

CLAUSE A4. The floating wind turbine platform (104) according to clause A3, wherein an angle between two adjacent sides of the irregular hexagon is a right angle.

CLAUSE A5. The floating wind turbine platform (104) according to any preceding clause, wherein each of the first, second and third columns (106*a-c*) connect to two of the first, second and third pontoon members (112*a-c*).

CLAUSE A6. The floating wind turbine platform (104) according to any preceding clause, wherein each of the first, second and third columns (106*a-c*) comprises a first and a second intersecting surface (118), each of the first and second intersecting surfaces (118) connected to one of the two of the first, second and third pontoon members (112*a-c*).

CLAUSE A7. The floating wind turbine platform (104) according to any preceding clause, wherein the first, second and third columns (106*a-c*) are connected by the first, second and third pontoon members (112*a-c*) in a triangular form.

CLAUSE A8. The floating wind turbine platform (104) according to any preceding clause, wherein the first, second and third connectors (122*a-c*) are located above and parallel to the first second and third pontoon members (112*a-c*).

CLAUSE A9. The floating wind turbine platform (104) according to any preceding clause, wherein each of the first, second and third columns (106a-c) comprises a first and a second intersecting surface (118) and each of the first and second intersecting surfaces (118) are connected to one of the two of the first, second and third connectors (122a-c).

CLAUSE A10. The floating wind turbine platform (104) according to any preceding clause, wherein each of the first, second and third columns (106a-c) comprises an inner intermediate side (150) and an outer intermediate side (151), the inner and outer intermediate sides (150, 151) being parallel to each other and perpendicular to an axis (132) extending between the centre of the lateral cross-section and the centre of the floating platform (104).

CLAUSE A11. The floating wind turbine platform (104) according to any preceding clause, wherein the horizontal length (b1) of the inner intermediate side (150) is smaller than the horizontal length (b2) of the outer intermediate side (151) or wherein the horizontal length (b1) of the inner intermediate side (150) is equal to the horizontal length (b2) of the outer intermediate side (151)

CLAUSE A12. The floating wind turbine platform (104) according to any preceding clause, wherein each of the first, second and third columns (106a-c) comprises a first external side (152) adjoining a first intersecting surface (118) and a second external side (153) adjoining a second intersecting surface (118).

CLAUSE A13. The floating wind turbine platform (104) according to any preceding clause, wherein the first and second external sides (152,153) each are flush with an outer side (154,155) of a respective pontoon members (112a-c).

CLAUSE A14. The floating wind turbine platform (104) according to any preceding clause, wherein the first and second external sides (152,153) each are flush with an outer side (149) of a respective connectors (122a-c).

CLAUSE A15. The floating wind turbine platform (104) according to any preceding clause, wherein, on each of the three sides of the substantially triangular hull, the respective external side (152,153) of the column (106a-c), the outer side (154,155) of the pontoon member (112a-c) and the outer side (149) of the connector (122a-c) are coplanar, particularly wherein the external side (152,153) of the column (106a-c), the outer side (154,155) of the pontoon member (112a-c) and the outer side (149) of the connector (122a-c) make up a single, planar surface.

CLAUSE A16. The floating wind turbine platform (104) according to any preceding clause, wherein each connector (122a-c) comprises a narrowed, central portion (145) and widened, end portions (146), wherein at outer ends (147) of the connector (122a-c) the widened end portion (146) has a horizontal length (c1) equal to the horizontal length (c2) of the adjacent intersecting surface (118).

CLAUSE A17. The floating wind turbine platform (104) according to any preceding clause, wherein the connectors (122a-c) between the ends (147) has a planar outward-facing vertical side (149), particularly wherein the entire outward-facing vertical side (149) is a single planar surface.

CLAUSE A18. The floating wind turbine platform (104) according to any preceding clause, wherein in each column (106a-c) an inner intermediate side (150) is connected to two adjoining intersecting surfaces (118), an outer intermediate side (151) is connected to two adjoining external sides (152,153), and each intersecting surface (118) is connected to a respective external side (152,153) to form a hexagonal lateral cross-section of the column.

CLAUSE A19. The floating wind turbine platform (104) according to the preceding clause, wherein an angle (v1) between the inner intermediate side (150) and the intersecting surfaces (118) is greater than an angle (v2) between the outer intermediate side (151) and the external sides (152,153) so as to produce an irregular hexagon.

CLAUSE A20. The floating wind turbine platform (104) according to any preceding clause, wherein each intersecting surface (118) is connected to a respective external side (152,153) at an angle of 90 degrees.

CLAUSE A21. The floating wind turbine platform (104) according to any preceding clause, wherein the sum of the horizontal length of the inner intermediate side (150) and the intersecting surfaces (118) is less than the sum of the horizontal length of the outer intermediate side (151) and the external sides (152,153).

CLAUSE A22. The floating wind turbine platform (104) according to any preceding clause, wherein the individual horizontal lengths of the inner intermediate side (150) and the intersecting surfaces (118) are less than the individual horizontal length of any of the outer intermediate side (151) and the external sides (152, 153).

CLAUSE A23. The floating wind turbine platform (104) according to any preceding clause, wherein the outer intermediate side (151) forms or forms part of a planar edge surface (148).

CLAUSE A24. The floating wind turbine platform (104) according to the preceding clause, wherein the planar edge surface (148) is a single planar surface extending across the full height of the hull.

CLAUSE A25. The floating wind turbine platform (104) according to any preceding clause, wherein about its horizontal periphery, the hull comprises exactly six planar, vertical surfaces making up the outermost bounds of the hull, the six surfaces being defined by three planar side surfaces (149,152,153,154,155) and three planar edge surfaces (148).

B-Clauses

CLAUSE B1. A floating wind turbine platform (104), comprising:
a substantially triangular hull configurable to support a wind turbine tower;
the hull comprising a first, second and third column (106a-c), the first, second and third columns (106a-c) being connected by a first, second and third pontoon member (112a-c), as well as by a first, second and third connector (122a-c),
wherein at least one of the first, second and third pontoon members (112a-c) comprises a ballast arrangement (124), and
wherein the wind turbine tower is configurable mounted to one of the first, second and third columns (106a-c), and the first, second and third columns (106a-c) are connected by the first, second and third pontoon members (112a-c) in a triangular form, such that the ballast arrangement (124) comprises a ballast compartment extending along substantially the entire length of a pontoon member (112a-c) located opposite the one of the first, second and third columns (106a-c) to which the turbine tower is configurable to be mounted.

CLAUSE B2. The floating wind turbine platform (104) according to clause B1, wherein the ballast arrangement (124) comprises a ballast compartment extending along substantially the entire length of one of the first, second and third pontoon members (112*a-c*).

CLAUSE B3. The floating wind turbine platform (104) according to any preceding clause, wherein the ballast arrangement (124) comprises a ballast compartment extending partially along the length of at least one of the first, second and third pontoon members (112*a-c*).

CLAUSE B4. The floating wind turbine platform (104) according to any preceding clause, wherein the ballast arrangement (124) comprises a ballast compartment extending along substantially one half of two of the first, second and third pontoon members (112*a-c*).

CLAUSE B5. The floating wind turbine platform (104) according to any preceding clause, wherein the ballast arrangement (124) comprises a ballast compartment extending along substantially one half of each of the first, second and third pontoon members (112*a-c*) that are located adjacent the one of the first, second and third columns (106*a-c*) to which the turbine tower is configurable to be mounted.

C-Clauses

CLAUSE C1. A floating wind turbine platform (104), comprising:
a substantially triangular hull configurable to support a wind turbine tower;
the hull comprising a first, second and third column (106*a-c*), the first, second and third columns (106*a-c*) being connected by a first, second and third pontoon member (112*a-c*), as well as by a first, second and third connector (122*a-c*);
wherein each connector comprises a narrowed central portion (145) and widened end portions (146).

CLAUSE C2. The floating wind turbine platform (104) of clause C1, wherein the horizontal length (c1) of each of the widened end portions (146) is equal to the horizontal length (c2) of the adjacent intersecting surface (118) to which the respective connector is connected.

CLAUSE C3. The floating wind turbine platform according to any preceding clause, wherein the widened end portions widen linearly from a horizontal length at an end adjacent the narrowed central portion (145) equal to the width of the narrowed central portion (145) to a horizontal length (c1) at an outer end thereof that is equal to the horizontal length (c2) of an adjacent intersecting surface (118).

CLAUSE C4. The floating wind turbine platform (104) according to any preceding clause, wherein the widened end portions have a horizontal cross-section of a trapezoidal shape, wherein the non-parallel sides of the trapezoidal shape are of different lengths.

CLAUSE C5. The floating wind turbine platform (104) according to clause C4, wherein the horizontal cross-section has an irregular trapezoidal shape.

CLAUSE C6. The floating wind turbine platform (104) according to any preceding clause, wherein each of the first, second and third connectors comprise a longitudinal axis and connect to the first, second and third columns (106*a-c*) at an interface, the centroid of interface being misaligned with the longitudinal axis of the connected connector (122*a-c*).

CLAUSE C7. The floating wind turbine platform (104) according to any preceding clause, wherein the first column is configured for mounting a wind turbine thereon, each of the first, second and third columns comprising at least two adjacent connectors and at least two adjacent widened end portions (146), wherein an axial length of the widened end portions, in the longitudinal direction of the respective connector, adjacent the first column is greater than an axial length of the widened end portions adjacent the second and third columns.

CLAUSE C8. The floating wind turbine platform (104) according to any preceding clause, wherein the widened end portions comprise the shape of an irregular truncated pyramid.

CLAUSE C9. The floating wind turbine platform according to any preceding clause, wherein each of the first, second and third columns (106*a-c*) comprises a first and a second intersecting surface (118) being connected to one of the first, second and third connectors.

D-Clauses

CLAUSE D1. A floating wind turbine platform (104), comprising:
a substantially triangular hull configurable to support a wind turbine tower;
the hull comprising a first, second and third column (106*a-c*), the first, second and third columns (106*a-c*) being connected by a first, second and third pontoon member (112*a-c*), as well as by a first, second and third connector (122*a-c*);
wherein each connector comprises two outer ends (147) and at least one side extending between the outer ends 147 thereof is planar.

CLAUSE D2. The floating wind turbine platform (104) according to clause D1, wherein one of the at least one planar sides is vertically oriented.

CLAUSE D3. The floating wind turbine platform (104) according to clause D1 or D2 wherein the vertically oriented surface is outward facing, for example facing away from the centroid of the substantially triangular hull.

CLAUSE D4. The floating wind turbine platform (104) according to any preceding clause, wherein the at least one planar side of each connector is a single planar surface.

CLAUSE D5. The floating wind turbine platform (104) according to any preceding clause, wherein each planar side is coplanar with a surface of one of the first, second and third columns (106*a-c*).

CLAUSE D6. The floating wind turbine platform (104) according to any preceding clause, wherein each of the first, second and third columns (106*a-c*) comprises a first external side (152) adjoining a first intersecting surface (118) and a second external side (153) adjoining a second intersecting surface (118).

CLAUSE D7. The floating wind turbine platform (104) according to clause D6, wherein the first and second external sides (152, 153) each are flush with an outer side (154, 155) of a respective pontoon member (112*a-c*).

CLAUSE D8. The floating wind turbine platform (104) according to clause D6 or D7, wherein the first and second external sides (152, 153) are flush with an outer side (149) of a respective connector (122*a-c*).

CLAUSE D9. The floating wind turbine platform (104) according to any preceding clause, wherein on each of the three sides of the substantially triangular hull, a respective external side (152, 153) of the column (106*a-c*), an outer side (154, 155) of the pontoon member (112*a-c*) and the planar surface of the connector are coplanar.

CLAUSE D10. The floating wind turbine platform according to clause D9, wherein the respective external side of the column (106a-c), the outer side of the pontoon member (112a-c) and the planar surface of the connector are vertically oriented.

CLAUSE D11. The floating wind turbine platform according to any preceding clause, wherein each connector comprises a narrowed central portion (145) and widened end portions (146).

CLAUSE D12. The floating wind turbine platform according to clause 11, wherein the widened end portions widen linearly from a horizontal length at an end adjacent the narrowed central portion (145) equal to the width of the narrowed central portion (145) to a horizontal length (c1) at an outer end thereof that is equal to the horizontal length (c2) of an adjacent intersecting surface (118).

CLAUSE D13. The floating wind turbine platform according to clause D11 or D12, wherein the widened end portions (146) have a horizontal cross-section of at least one of an irregular trapezoid or a right-angled trapezoid.

The invention claimed is:

1. A floating wind turbine platform, comprising:
a triangular hull configurable to support a wind turbine tower;
the hull comprising a first, second and third column, the first, second and third columns being connected by a first, second and third pontoon member, as well as by a first, second and third connector,
wherein:
a lateral cross-section of each of the first, second and third columns has a shape of an irregular convex polygon;
each of the first, second and third columns comprises first and second intersecting surfaces, each intersecting surface being oriented perpendicular to a longitudinal axis of the first, second or third pontoon member; and
each of the first, second and third columns comprises a first external side adjoining the first intersecting surface and a second external side adjoining the second intersecting surface, each external side being co-planar with a side of the first, second or third pontoon member.

2. The floating wind turbine platform according to claim 1, wherein the lateral cross-section of each of the first, second and third columns has the shape of an irregular hexagon.

3. The floating wind turbine platform according to claim 2, wherein an angle between two adjacent sides of the irregular hexagon is a right angle.

4. The floating wind turbine platform according to claim 1, wherein each of the first, second and third columns connect to two of the first, second and third pontoon members.

5. The floating wind turbine platform according to claim 4, wherein each of the first and second intersecting surfaces is connected to one of the first, second and third pontoon members.

6. The floating wind turbine platform according to claim 5, wherein the first, second and third columns are connected by the first, second and third pontoon members in a triangular form.

7. The floating wind turbine platform according to claim 1, wherein the first, second and third connectors are located above and parallel to the first second and third pontoon members.

8. The floating wind turbine platform according to claim 1, wherein each of the first and second intersecting surfaces are connected to one of the first, second and third connectors.

9. The floating wind turbine platform according to claim 1, wherein each of the first, second and third columns comprises an inner intermediate side and an outer intermediate side, the inner and outer intermediate sides being parallel to each other and perpendicular to an axis extending between the center of the lateral cross-section and the center of the floating wind turbine platform.

10. The floating wind turbine platform according to claim 9, wherein the horizontal length of the inner intermediate side is smaller than the horizontal length of the outer intermediate side or wherein the horizontal length of the inner intermediate side is equal to the horizontal length of the outer intermediate side.

11. The floating wind turbine platform according to claim 1, wherein the first and second external sides each are coplanar with an outer side of a respective connector.

12. The floating wind turbine platform according to claim 1, wherein, on each of the three sides of the triangular hull, the respective external side of the column, the outer side of the pontoon member and the outer side of the connector are coplanar, such that the external side of the column, the outer side of the pontoon member and the outer side of the connector make up a single, planar surface.

13. The floating wind turbine platform according to claim 1, wherein each connector comprises a narrowed, central portion and widened, end portions, wherein at outer ends of the connector the widened end portion has a horizontal length equal to the horizontal length of the adjacent intersecting surface.

14. The floating wind turbine platform according to claim 13, wherein the first column is configured for mounting a wind turbine thereon, each of the first, second and third columns comprising at least two adjacent connectors and at least two adjacent widened end portions, wherein an axial length of the widened end portions, in the axial direction of the respective connector, adjacent the first column is greater than an axial length of the widened end portions adjacent the second and third columns.

15. The floating wind turbine platform according to claim 1, wherein the connectors between the ends have a planar outward-facing vertical side, wherein the entire outward-facing vertical side is a single planar surface.

16. The floating wind turbine platform according to claim 1, wherein in each column an inner intermediate side is connected to two adjoining intersecting surfaces, an outer intermediate side is connected to two adjoining external sides, and each intersecting surface is connected to a respective external side to form a convex hexagonal lateral cross-section of the column.

17. The floating wind turbine platform according to claim 16, wherein an angle between the inner intermediate side and the intersecting surfaces is greater than an angle between the outer intermediate side and the external sides so as to produce an irregular hexagon.

18. The floating wind turbine platform according to claim 1, wherein each intersecting surface is connected to a respective external side at an angle of 90 degrees.

19. The floating wind turbine platform according to claim 16, wherein the sum of the horizontal length of the inner intermediate side and the intersecting surfaces is less than the sum of the horizontal length of the outer intermediate side and the external sides.

20. The floating wind turbine platform according to claim 16, wherein the individual horizontal lengths of the inner intermediate side and the intersecting surfaces are less than the individual horizontal length of any of the outer intermediate side and the external sides.

* * * * *